United States Patent
Noda et al.

(10) Patent No.: US 8,518,363 B2
(45) Date of Patent: Aug. 27, 2013

(54) METHOD FOR PRODUCTION OF CARBON NANOTUBE

(75) Inventors: Suguru Noda, Tokyo (JP); Hisashi Sugime, Tokyo (JP); Yukio Yamaguchi, Kawasaki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/440,317

(22) PCT Filed: Sep. 7, 2007

(86) PCT No.: PCT/JP2007/067539
§ 371 (c)(1),
(2), (4) Date: Jun. 9, 2010

(87) PCT Pub. No.: WO2008/029927
PCT Pub. Date: Mar. 13, 2008

(65) Prior Publication Data
US 2010/0247421 A1    Sep. 30, 2010

(30) Foreign Application Priority Data
Sep. 8, 2006   (JP) .................. 2006-244643

(51) Int. Cl.
*D01C 5/00*    (2006.01)
(52) U.S. Cl.
USPC ............. 423/447.3; 423/447.1; 977/843
(58) Field of Classification Search
USPC .......... 423/447.1, 447.3, 445 B, DIG. 40; 977/742, 842, 843
See application file for complete search history.

(56) References Cited

U.S. PATENT DOCUMENTS 7,347,981 B2 *  3/2008  Crespi et al. ............... 423/447.1
2002/0131910 A1 *  9/2002  Resasco et al. ............ 422/139
(Continued)

FOREIGN PATENT DOCUMENTS

EP       1061041 A1 * 12/2000
JP       2000-072431    3/2000
(Continued)

OTHER PUBLICATIONS

S.Iijima, "Helical microtubules of graphitic carbon", Nature 354, 56 (Nov. 1991).
(Continued)

*Primary Examiner* — Stuart Hendrickson
*Assistant Examiner* — Richard M Rump
(74) *Attorney, Agent, or Firm* — Antonelli, Terry, Stout & Kraus, LLP.

(57) ABSTRACT

[Problems to be Solved]There is provided a method for production of a carbon nanotube, which allows for production of the carbon nanotube in a large scale and at a low cost.
[Solution]
The temperature of a catalyst loaded on a support is raised by heating the support and a raw material gas containing a carbon source is supplied on the catalyst to synthesize the carbon nanotube. The synthesized carbon nanotube is recovered, and after the recovery, the catalyst is subjected to a regeneration treatment to repeatedly utilize the support. Since the catalyst deteriorates, the catalyst is regenerated periodically or non-periodically during the production. The regeneration treatment of the catalyst involves an oxidation treatment of the catalyst. Further, after the oxidation treatment, a reducing gas is fed to and brought into contact with the catalyst surface to reduce the catalyst. As the support, a honeycomb is used.

34 Claims, 21 Drawing Sheets

(56) References Cited

U.S. PATENT DOCUMENTS

| | | | |
|---|---|---|---|
| 2003/0148086 A1* | 8/2003 | Pfefferle et al. | 428/293.7 |
| 2004/0081758 A1* | 4/2004 | Mauthner et al. | 427/249.1 |
| 2006/0018820 A1* | 1/2006 | Little | 423/445 B |
| 2009/0192205 A1* | 7/2009 | Augustijns et al. | 514/384 |

FOREIGN PATENT DOCUMENTS

| | | |
|---|---|---|
| JP | 2001-080902 | 3/2001 |
| JP | 2001-080912 | 3/2001 |
| JP | 2001-288626 | 10/2001 |
| JP | 2003-535794 | 12/2003 |
| JP | 2004-238261 | 8/2004 |
| JP | 2006-027948 | 2/2006 |
| JP | 2006-027948 A1 * | 2/2006 |
| WO | WO 2005/000740 | 1/2005 |

OTHER PUBLICATIONS

H.Dai, et al., 'Single-wall nanotubes produced by metal-catalyzed disproportionation of carbn monoxide', Chem.Phys.Lett.260, 471(May 1996).

M.J.Bronikowski et al., 'Gas-phase production of carbon single-walled nanotubes from carbon monoxide via the HiPco process: A parametric study', J.Vac.Sci.Technol.A19, 1800 (Jul./Aug. 2001).

K.Hata et al., 'Water-Assisted Highly Efficient Synthesis of Impurity-Free Single-Walled Carbon Nanotubes', Science 306, 1362 (Nov. 2004).

* cited by examiner

Fe FILM THICKNESS DISTRIBUTION (a)

| | FIRST TIME | DUSTER | ULTRASONIC WAVE | ANNEAL | SECOND TIME |
|---|---|---|---|---|---|
| Fe-Mo | | | | | SUITABLE CONDITION |
| Ni-Mo | | | | | |
| Co-Mo | | | | | |

METHOD FOR PRODUCTION OF CARBON NANOTUBE

TECHNICAL FIELD

The present invention relates to a method for producing carbon nanotubes. Particularly, the present invention relates to a method for producing carbon nanotubes having various structures at a low cost and in a large scale in mass production.

BACKGROUND ART

The carbon nanotube (hereinafter, referred to as CNT) has a structure in which a graphene sheet is cylindrically wound, and is a material having a one-dimensional structure having a very large aspect ratio (see Nonpatent Document 1). CNT is known to have excellent mechanical strengths, flexibility and further very stable chemical properties. The production methods of CNT reportedly include the arc discharge method, the laser vaporization method and the chemical vapor deposition method (hereinafter, referred to as CVD). Especially, the CVD method is a synthesis method attracting attention as a method suitable for mass synthesis, continuous synthesis and high-purification (refer to R. Saito, and H. Shinohara (coeds.) "Foundation and Application of Carbon Nanotube", published by Baifukan Co., Ltd.).

Further, a single-walled CNT (hereinafter, referred to as SWNT) is confirmed to exhibit metallic properties and semi-conductic properties depending on its winding way and its diameter, and is expected to be applied to electric and electronic devices and the like. The synthesis method of SWNT is predominantly a catalyst CVD method (see, for example, Nonpatent Document 2) to grow nanotubes. The catalyst CVD method involves production using metal nanoparticles as a catalyst. While a gaseous carbon source is supplied, the carbon source is catalytically decomposed at a high temperature to grow nanotubes on the metal nanoparticles. At this time, production is carried out using the nanoparticle catalyst in a state dispersed in a gas phase (hereinafter, referred to as method A). There is also a method in which the nanoparticle catalyst is used in a state loaded on a substrate (hereinafter, referred to as method B). These methods A and B each have advantages and disadvantages.

[About Existing SWNT Production Methods]

FIG. 17 is a diagram showing the outline of the method A (gas phase-dispersed catalyst). Synthesis of SWNT is carried out by simultaneously spraying a catalyst source and a carbon source into an externally heating reactor. Typical synthesis methods classified into the method A include HiPco method (for example, see Nonpatent Document 3) and the like. This method A can effectively utilize the three-dimensional space of the reactor. However, since the catalyst accompanies a reaction gas, the retention time of the catalyst in the reactor is short and the catalyst SWNT, contaminates a reaction product. Further, since the catalyst particles are as small as several nanometers and aggregate rapidly, the space concentration of the catalyst can hardly be raised.

FIG. 18 is a diagram showing the outline of the method B (substrate-loaded catalyst). In the method B, a catalyst is loaded on a substrate; and a carbon source is supplied on the catalyst. Super Growth method (for example, see Nonpatent Document 4) and the like are classified into this method B; and Super Growth method is a typical method B. This method B allows for a high-rate growth. For example, a high-rate growth of 3 mm/10 min is carried out. The catalyst is fixed on the substrate, and contamination of a synthesized SWNT with the catalyst is therefore suppressed. However, since only a planar two-dimensional space of a reactor can be utilized, the space utilization in a reactor is inferior to the method A.

Further, a separation process to separate the synthesized SWNT is required. In the case of mass production of SWNT, repeating use of a substrate with a catalyst attached is indispensable, and this technique has not yet been established. Further, a method is proposed in which Ni is coated on the inner wall of a honeycomb substrate, and carbon nanofibers are grown thereon (Patent Document 1). However, the honeycomb substrate is not for production of carbon nanofibers, but for production of a fixed body in which carbon nanofibers are held densely on the body. The honeycomb substrate itself is mounted on automobiles and the like, and is used as a hydrogen storage body.

Nonpatent Document 1: S. Iijima, Nature 354, 56 (1991)
Nonpatent Document 2: H. Dai, A. G. Rinzler, P. Nikolaev, A. Thess, D. T. Colbert, and R. E. Smalley, Chem. Phys. Lett. 260, 471 (1996)
Nonpatent Document 3: HiPco method: M. J. Bronikowski, P. A. Willis, D. T. Colbert, K. A. Smith, and R. E. Smalley, J. Vac. Sci. Technol. A19, 1800 (2001)
Nonpatent Document 4: K. Hata, D. N. Futaba, K. Mizuno, T. Namai, M. Yumura, and S. Iijima, Science 306, 1362 (2004)
Patent Document 1: Japanese Patent Laid-Open No. 2001-288626

DISCLOSURE OF THE INVENTION

Problems to be Solved by the Invention

The trade price of SWNT in the market is higher than those of noble metals. The high price of SWNT causes a great bottleneck to applications utilizing mechanical characteristics and conductive characteristics of SWNT. If the production of CNT becomes possible in a large scale at a low cost, various applications can be expected to be realized rapidly. Therefore, the innovation of the production technology and the low production cost of CNT are essential.

The present invention has been achieved with the above-mentioned technology background, and achieves objects described below.

It is an object of the present invention to provide a method for production of a carbon nanotube capable of producing CNT in a large scale and at a low cost.

It is another object of the present invention to provide a method for production of a carbon nanotube capable of continuously producing CNT.

It is further another object of the present invention to provide a method for production of a carbon nanotube, which method spreads a substrate-loaded catalyst in the three-dimensional space of a CVD reactor, and has advantages for both of the gas phase-dispersed catalyst and the substrate-loaded catalyst.

Means for Solving the Problems

The carbon nanotube production method of the present invention employs the following means to achieve the above-mentioned objects. That is, the carbon nanotube production method of the present invention is characterized by a carbon nanotube synthesis method in which a carbon source is supplied on a catalyst loaded on a support to synthesize the carbon nanotube, the synthesis method comprising heating the support to raise the temperature of the catalyst; supplying a raw material gas containing the carbon source to synthesize the carbon nanotube; recovering the synthesized carbon nanotube; and after the recovery, subjecting the catalyst to a regeneration treatment to repeatedly utilize the support for the synthesis.

The present invention provides a method for production of a carbon nanotube to continuously synthesize the carbon nanotube. The carbon nanotube production method of the present invention involves synthesis of a carbon nanotube by supplying a carbon source on a catalyst loaded on a support. The temperature of the catalyst is raised by heating the support, and a raw material gas containing the carbon source is supplied to synthesize the carbon nanotube. The synthesized carbon nanotube is separated from the support, and recovered, and thereafter, the catalyst is subjected to a regeneration treatment to repeatedly utilize the support.

Hereinafter, major elements constituting the carbon nanotube production method of the present invention will be described respectively.

(Catalysts)

"Catalyst" used in the present invention refers to that loaded on a support, and indicates a common catalyst. A carbon nanotube is synthesized from a carbon material by supplying a carbon source to the catalyst while achieving assistance, promotion and efficiency promotion of the synthesis of the carbon nanotube. "Catalyst" used in the present invention indicates a material having functions of taking up a carbon source and discharging a carbon nanotube. Further, "catalyst" indicates a catalyst held on a support composed of a metal nanoparticle having a nanometer-order size, a solid, a semisolid material or the like.

(Kinds of Supports)

A support is a structure to hold a catalyst, a catalyst carrier (its definition will be described later), a catalyst capping material (its definition will be described later) or the like in a reactor. The support is generally preferably a solid material. The support is preferably one whose surface area per unit volume can be made as large as possible, and specifically, is preferably one which has a specific surface area of 0.1 to 10.0 $mm^2/mm^3$ or more. The support more preferably has a honeycomb structure known as a structure, for example, like arrayed hexagonal pipes in the cross-sectional shape. Other than the honeycomb structure, structures may be those such as a large number of plate materials arrayed, arrayed corrugated plate materials, and arrayed rectangular pipes in the cross-sectional shape.

Ceramics are preferably used for a material for a support because they are excellent in characteristics such as heat resistance, corrosion resistance, chemical resistance and mechanical strengths. For the support, a ceramic is preferably used such as a well-known alumina-based one, silicon carbide-based one or the like containing one or more elements selected from Si, Al, Zr and Mg. However, the support is not limited to a ceramic, and may use a metal material composed of a metal or an alloy containing one or more elements selected from Fe, Co and Ni.

(Catalysts/Fabrication of Catalysts)

The catalyst of the present invention is fabricated as follows. The catalyst of the present invention is loaded by bringing a liquid raw material obtained by dissolving a raw material of the catalyst in a solvent into contact on a support, and drying the liquid raw material. In this case, the support is immersed in the liquid raw material, and then drawn out and dried. Alternatively, a mist of a liquid raw material may be made to pass along a support to load the catalyst. Liquid raw materials utilizable are aqueous solutions of metal inorganic salts such as nitrates, phosphates and chlorides, and organic solutions of metal organic salts such as alkoxides and acetates.

A catalyst can be loaded by vaporizing a raw material of the catalyst and bringing the vaporized raw material into contact on the support. In this case, the vaporized raw material of the catalyst is supplied to the support at a high temperature, and the catalyst is loaded on the support. Alternatively, a liquid raw material is supplied to a support at a high temperature; the liquid raw material may be evaporated in the high temperature for the support to load the catalyst. Catalyst raw materials utilizable are aqueous solutions of metal inorganic salts such as nitrates, phosphates and chlorides, and organic solutions of metal organic salts such as alkoxides and acetates. In the case of Fe catalysts, especially ferrocene is preferable.

The catalyst preferably contains as its component(s) one or more elements selected from Fe, Co, Ni, Mo and Cr. Further, the catalyst is preferably formed on a catalyst carrier containing one or more elements selected from Si, Al, Mg, Zr and Mo. "Catalyst carrier" described here indicates a material on which metal nanoparticles adhere, and a layer formed of an oxide such as $SiO_2$, $Al_2O_3$, aluminosilicates or MgO, a nitride such as $Si_3N_4$ or AlN, or a carbide such as SiC. The support may have a combined function as a carrier.

Al sources of the catalyst carrier are preferably organic salts and organoaluminums containing Al such as $Al(NO_3)_3$ and $AlCl_3$. Si sources of the catalyst carrier usable are inorganic substances and organic substances containing Si, but TEOS is preferable in view of easy handleability and the like. The catalyst is preferably covered partially with a catalyst capping material containing one or more elements selected from Si, Al, Mg, Zr and Mo. "Catalyst capping material" described here indicates a material having a function of interposing a catalyst between a catalyst carrier and a support by covering partially the surface of the catalyst.

"Catalyst capping material" used in the present invention refers to a layer formed on metal nanoparticles and formed of an oxide such as $SiO_2$, $Al_2O_3$ or MgO, a nitride such as $Si_3N_4$ or AlN, or a carbide such as SiC. The "catalyst capping material" sometimes improves characteristics of a catalyst by actions including suppression of aggregation of metal nanoparticles. As raw materials of Al, Fe and Co for catalyst and carrier raw materials, organic raw materials and inorganic raw materials containing these elements can be utilized. Specifically, Al sources for the catalyst and carrier raw materials are preferably one or more substances selected from aluminum chloride ($AlCl_3$), aluminum isopropoxide ($Al(iso-OC_3H_7)_3$), aluminum acetylacetonate ($Al(iso-C_5H_7O_2)_3$) and trimethylaluminum ($Al(CH_3)_3$).

Fe sources for catalyst and carrier raw materials are preferably tris(2,4-pentanedionate)iron(III) ($Fe(C_5H_7FeO_2)_3$), ferrocene (($C_5H_5)_2Fe$), iron(III) nitrate nonahydrate ($Fe(NO_3)_3 \cdot 9H_2O$) and iron carbonyl ($Fe(CO)_5$). Co sources for catalyst and carrier raw materials are preferably tris(2,4-pentanedionate)cobalt(III) ($Co(C_5H_7O_2)_3$), and/or cobalt(II) nitrate hexahydrate ($Co(NO_3)_2 \cdot 6H_2O$).

(Heating of a Support)

For heating the above-mentioned support, the following method is preferably employed. In the present invention, a carbon nanotube is synthesized by the thermal CVD method. The thermal CVD method is a method in which a thin film is formed by a chemical reaction in a gas phase of a gas or a vapor of a liquid raw material generated by raising its temperature, or on a substrate surface. The method in which the energy causing the chemical reaction is imparted in a form of a thermal energy from a substrate and a reactor vessel wall is known as the thermal CVD method.

The heating method may be one which heats the entire reactor by a heating furnace, by which a carbon nanotube is synthesized. Alternatively, a carbon nanotube may be synthesized by ohmically heating a support. That is, instead of heating the entire reactor by a heating furnace, a carbon nanotube is synthesized by ohmically heating the support. The heating means can utilize an electric furnace, a combustion furnace, heat exchange, infrared-ray heating, and in the case of a support composed of a conductive material, ohmic heating and induction heating as well.

The temperature of a heated reactor is preferably a temperature higher than the melting temperature of catalyst particles and lower than the decomposition temperature of a carbon source. The temperature range where SWNT grows by CVD using a loaded catalyst is preferably about 400 to 1,200° C. Further, when SWNT is synthesized using a support of a honeycomb structure, the temperature range is most preferably 600° C. or more and 1,000° C. or less.

(Carbon Raw Materials)

Carbon raw materials preferably include one or more selected from alkanes (paraffinic hydrocarbons), alkenes (olefinic hydrocarbons), alcohols, ethers, aldehydes, ketones, aromatics, acetylene and carbon monoxide. A gas containing a raw material of a carbon source is preferably blown at 0.001 MPa (0.01 atm) to 1.013 MPa (10 atm) to the above-mentioned catalyst to carry out the thermal CVD.

(A Mixed Gas in which a Carbon Raw Material is with a Carrier Gas Mixed)

A volatile compound of a carbon raw material is vaporized, and mixed with a carrier gas such as hydrogen, argon or nitrogen, and blown to the above-mentioned catalyst. The mixed gas preferably contains oxygen as an element.

(Separation and Recovery)

Since the synthesized carbon nanotube is laminated or stays on or in the vicinity of the surface of a catalyst, a catalyst capping material, a catalyst carrier, a support and the like, they must be separated to recover the carbon nanotube only. The synthesized carbon nanotube is preferably separated using a nonstationary gas pulse or a stationary gas flow. The nonstationary gas pulse refers to making a flow rate of an inert gas such as argon or nitrogen into pulsed flows on a certain time period. The stationary gas flow refers to an inert gas flow having a constant gas flow rate.

The synthesized carbon nanotube, which is laminated or stays on or in the vicinity of the surface of a catalyst, a catalyst capping material, a catalyst carrier, a support or the like, is separated by a dynamic pressure of the gas flow. A kinetic energy of a fluid having a density and a velocity has a dimension of pressure, which is the dynamic pressure. The carbon nanotube can be collected on the filter by filtering the gas containing the carbon nanotube separated by the dynamic pressure through a filter.

Further, the carbon nanotube can also be collected in a liquid by bringing the gas containing the separated carbon nanotube into contact with the liquid. Further, the carbon nanotube can also be collected by thermal migration by bringing, by a gas flow, the gas containing the separated carbon nanotube into contact with a solid wall or a liquid wall having a lower temperature than that of the gas flow.

(Regeneration Treatment of Catalysts)

The regeneration treatment of the catalyst of the present invention refers to periodic or non-periodic regeneration during production of a catalyst degraded, inactivated or exhausted due to production of the carbon nanotube. The regeneration of a catalyst preferably involves an oxidation treatment of the catalyst. The oxidation treatment may be a heat treatment in the oxygen atmosphere in air. The oxidation treatment can utilize an oxidizing agent. The oxidizing agent utilizable is oxygen or steam. Further, a coexistant gas with steam and oxygen, and the like can also be utilized as an oxidizing agent.

After the oxidation treatment, a reducing gas is preferably fed to and brought into contact with the catalyst surface to reduce the catalyst. After the oxidation treatment, a carbon source is preferably fed to, and brought into contact with the catalyst surface to reduce the catalyst to regenerate the catalyst. A method may be used in which a reducing gas such as hydrogen is made to flow for the reduction treatment; and when a catalyst raw material is sputtered to form a film, hydrogen may be mixed as a carrier gas, and used as a reducing gas. Further, the regeneration treatment of a catalyst preferably involves replenishment of elements contained in the catalyst.

Therefore, the above-mentioned oxidation and reduction treatments use a well-known oxidizing agent and reducing agent depending on the kind of the selected catalyst. The above-mentioned replenishment is preferably carried out by feeding and contacting a gas containing elements contained in the catalyst on the surface of the catalyst. The elements for a catalyst are preferably made previously contained in the catalyst and/or a support, and are made gradually diffuse on the surface of a catalyst carrier to carry out the replenishment.

As the above-mentioned reducing gases, reducing gases such as hydrogen ($H_2$) and $NH_3$ can be used. Further, a carbon source itself can be used as a reducing agent at the same time. Carbon sources utilizable are alkanes such as $CH_4$ and $C_2H_6$, alkenes such as $C_2H_4$ and $C_3H_6$, alkynes such as $C_2H_2$, alcohols such as $CH_3OH$ and $C_2H_5OH$, and CO, Further, Molecules composed of C, H, O(N, S), such as aldehydes and ketones, are also utilized as carbon sources.

(SWNT)

The carbon nanotube production method of the present invention can produce carbon nanotubes having various types of structures, but is particularly a method suitable for production of single-walled carbon nanotube (SWNT).

(The Carbon Nanotube Production Method of the Present Invention)

The outline of the production method of the carbon nanotube (hereinafter, referred to as CNT) of the present invention is as follows. The carbon nanotube production method of the present invention has features in the method of producing CNT massively and continuously. First, a nanoparticle catalyst is loaded on a solid support having a large specific surface area (the first step).

The nanoparticle catalyst on the support is heated and CNT is grown while a carbon source of a volatile compound mixed in a carrier gas and the like is supplied (the second step). After the synthesis of CNT, CNT laminated or staying on the surface of, or in the vicinity of the support, the catalyst, a catalyst capping material, a catalyst carrier and the like is separated by blowing a gas such as an inert gas (the third step). The gas is blown in pulses repeating in a certain time period and at a constant velocity, or blown at a constant velocity. Then, the separated CNT is recovered (the fourth step).

Thereafter, the support with the nanoparticle attached is regenerated (the fifth step). That is, for utilizing the support repeatedly, the catalyst on the support is regenerated. Here, the support may be regenerated in a regular or nonregular interval. Then, on the above-mentioned cycle, the nanoparticle catalyst on the support is heated and CNT is grown while the carbon source is supplied (the second step). In such a way, the support with the nanoparticle catalyst attached is regenerated and CNT is synthesized continuously. The present invention can be regarded as a combined synthesis method of the method A and the method B described in Background Art.

That is, the method is one in which a loaded catalyst in the method B is spread from a two-dimensional space to a three-dimensional space in a pseudo way by fabricating the loaded catalyst using a support having a large specific surface area.

Advantages Of The Invention

The carbon nanotube production method of the present invention exhibits the following effect. Since the present invention uses a support having a large specific surface area per unit volume of a honeycomb structure or the like, it has a high space utility factor, and is suitable for a large-scale production of CNT. Further, the honeycomb structure suppresses the pressure loss, and is suitable for blowing a gas in a high velocity. Therefore, CNT can easily be separated and recovered from the support of a honeycomb structure by a nonstationary gas pulse or a stationary gas flow, and the mingling of a catalyst into the produced CNT can be suppressed. Additionally, the present invention provides the regeneration of the catalyst loaded on the support of a honeycomb structure, thereby enabling the repeated synthesis of CNT.

BEST MODES FOR CARRYING OUT THE INVENTION

Hereinafter, embodiments of the present invention will be described specifically. FIG. 1 is a conceptual diagram showing the outline of an embodiment of the present invention. As shown in FIG. 1, in a circular or square cylinder 1 both ends of which are open, a honeycomb 2 of a support is inserted and disposed. For easy understanding, the cross-section of the honeycomb is illustratively shown in Figure. On a fixed substrate 2 thereof, semispherical catalysts 3 are formed as shown in FIG. 2. The catalyst 3 is a nanoparticle catalyst. That is, the geometric size (particle diameter and the like) of the nanoparticle catalyst is about 1 nm to 10 nm. In FIG. 2, the nanoparticle catalysts are formed only on one surface of the fixed substrate 2. The nanoparticle catalysts may be formed on both front and back sides of the fixed substrate 2.

The honeycomb 2 is disposed in the cylinder 1 shown in FIG. 1. A heater 4 for heating the honeycomb 2 is installed so as to wind around the outside of the cylinder 1. When the heater 4 is activated, the heater is heated, and the honeycomb 2 is heated to a predetermined temperature through thermal conduction. When the fixed substrate 2 is heated, the catalysts 3 formed thereon are heated. When a carbon source is supplied thereto, CNT is synthesized and grown on the catalysts 3. The carbon source of a volatile compound is blown and supplied as a raw material gas together with a carrier gas such as hydrogen, argon or nitrogen from one end of the cylinder 1. By this method in which a carbon source is contained in the raw material gas, the carbon source is supplied in a predetermined time and CNT is synthesized.

After the synthesis of CNT, CNT is separated and recovered from the fixed substrate 2. For separating CNT from the fixed substrate 2, a gas is supplied into the cylinder 1. The wind velocity of the separation gas must be such a magnitude as to separate CNT from the fixed substrate 2, that is, the catalysts 3. The supply of the separation gas is carried out by repeating alternately the supply and the suspension of the separation gas, that is, the separation gas is pulsatingly blown. Further, since CNT which has been grown longer can be separated by a lower wind velocity, CNT which has been grown longer can be separated from the cylinder by circulating the raw material gas at a constant flow rate. Finally, CNT is recovered through a filter 6.

FIG. 3 shows a process flow when CNT is synthesized. As a whole, it comprises processes of fabrication of a catalyst, synthesis of CNT, separation of the CNT and the loaded catalyst, collection of the CNT, and regeneration of the loaded catalyst. Each process will be described in detail.

(Fabrication of a Loaded Catalyst)

There are various types of modifications of fabrication depending on the kinds of a support and a catalyst used. This embodiment uses a honeycomb as an example of supports. The honeycomb is known to have features of being robust and the like as a structural body having a large surface area per unit volume.

In synthesis of CNT, the specific surface area of a support is a great element exerting an influence on the productivity. However, even if the specific surface area is made large by a nano-/millimeter-scale microstructure, the productivity is controlled by the diffusion rate of a gas source. That is, since the reaction rate is determined by a rapidity with which the reacting gas source contacts with the support, only a part of the surface can be utilized. By making a structural body having the nearly same size and scale as that of gas films, the specific surface area needs to be acquired. Conventionally, one sheet of a substrate has been used as a support. N sheets of substrates, each having a two-dimensional structure, are laminated at intervals in the height direction, resulting in providing an entire surface area 2N times a surface area of one surface by both front and back surfaces thereof; and employing a honeycomb structure obtained by crossing the stacking structures allows for increasing the entire surface area to 4N times (in the case of hexagonal, 6N times).

Also in this view, a honeycomb has an ideal structure. A honeycomb is a member composed of a ceramic of about 0.1 mm in thickness, and is an assembly having vacant spaces of internally-hollowed quadrangular cylinders (or hexagonal cylinders) having a cross-section of a quadrate (or a regular hexagon) of about 1 mm in side. If one side of a quadrate is denoted as "a" [mm], the specific surface area is 4 [mm$^2$/mm$^3$] when a=1 [mm], according to 4a×L/a$^2$L=4/a [mm$^2$/mm$^3$].

(Separation of CNT and a Loaded Catalyst)

Separation of a synthesized CNT and a loaded catalyst is carried out by supplying a separation gas. The separation gas may be a gas pulse by a method in which the supply and the suspension of a gas inert for synthesis are repeated at a constant velocity and for a certain time, that is, a gas pulse supplied while pulsatingly varied, or a separation gas supplied continuously and at a constant flow rate.

(Collection of CNT)

The separated CNT is collected. The collection can employ various types of methods. Firstly, a gas containing the separated CNT is filtered by a filter to collect CNT on the filter. Alternatively, a gas containing the separated CNT may be brought into contact with a liquid to collect CNT in the liquid, or the gas may be brought into contact with a low-temperature solid wall or liquid wall by a gas flow to collect CNT through thermal migration.

(Regeneration of a Loaded Catalyst)

The regeneration of a loaded catalyst is an important elementary technology for the massive synthesis, continuous production and cost reduction of CNT. The present embodiment regenerates a catalyst on a support to enable repeated utilization of the support. For this, first, a synthesized CNT is separated from a loaded catalyst. Thereafter, the catalyst is subjected to an oxidation treatment. After the oxidation treatment, the catalyst is reduced by circulating a reducing gas. The reduction of the catalyst can be carried out also by circulating a carbon source. Further, elements contained in the catalyst are simultaneously replenished. Alternatively, elements for reduction of the catalyst may be previously made contained in the catalyst or the support to be gradually diffused on the surface of a catalyst carrier. The reducing gas utilizable is hydrogen.

(About the Film Thickness Distribution)

For regenerating exhausted, dropping-off and diffused nanoparticles, components thereof are gasified and supplied to a support to form a film, and since the film thickness affects the size of the nanoparticles, the distribution of the film thickness has a great significance. That is, the control of the film thickness is important for fabricating semispherical nanoparticles of a constant size.

The film thickness distribution can be determined from a distribution of measured film-forming rates and a film-forming time. The film-forming rate distribution fundamentally depends on how the gap is viewed from a point on a support, that is, a substrate on which catalysts are loaded, and can be approximately estimated from the solid angle. When the catalyst itself becomes to have a particle size, that is, a film thickness, on which CNT is easily synthesized, CNT rapidly grows. If a film containing metal atoms is heated to a reaction temperature of CNT, the film is semispherically repelled and forms nanoparticles by the force of surface tension. At this time, since one particle is Bawled within the range where the metal atoms can diffuse, the amount of the metal atoms within the range determines the size of the nanoparticle. The ratio of the amount (volume) and the range (area) indicates the film thickness.

Thus, the size of nanoparticles varies depending on the film thickness. The film thickness thicker than that of the above-mentioned particle size on which CNT is easily synthesized results in formation of a continuous film and in not being able to make a catalyst. The gas is uniformly supplied on the substrate loading the catalyst. When the catalyst is loaded uniformly on the substrate, CNT uniformly sprouts and grows. However, when a film thickness increases, a carbon source cannot diffuse and been supplied from the upper surface of the film, and the growth rate in the vicinity of the edge of the film from the side of which carbon can diffuse becomes high.

The embodiments of the present invention will be described in detail by way of Examples.

EXAMPLE 1

Hereinafter, Example 1 of the present invention will be described. Here, as a support, a quartz glass ($SiO_2$) substrate was used. A film of Mo and Co as catalyst raw materials was formed thereon by sputtering. Mo and Co were made to have film thickness distributions orthogonal to each other of 0.03 to 2 nm and 0.01 to 0.8 nm, respectively, to examine the CNT production activity depending on the catalyst amounts. The quartz glass substrate was put in a CVD reactor; and the temperature in the CVD reactor was raised to 800° C. while a $H_2/Ar$ gas was blown. Then, the gas was changed over and while ethanol at 3 to 30 Torr was supplied to the CVD reactor, the synthesis was carried out for 3 to 30 min by the CVD method to grow a single-walled CNT (hereinafter, referred to as SWNT).

FIG. 4 is optically scanned images of the quartz glass substrates after CVD. The Mo film thickness is thicker from the left to the right of the quartz glass substrate; and the Co film thickness is thicker from bottom to top. The production amount of SWNT varies and the colors of the quartz glass substrates also vary depending on the film thicknesses of these catalysts. Although color distributions are different depending on the CVD condition, in FIG. 4, points high in activity are shown as (I) to(III). The points (I) and (III) are found to have high activities not depending on the CVD condition. The film thicknesses distribution of the catalyst raw materials of the point (II) are Mo 0.1 nm/Co 0.2 nm. The point (III) is a region of Mo 0.3 nm/Co 0.1 nm.

On the other hand, at an ethanol partial pressure of 30 Torr, the point (I) on the left top of the quartz glass substrate rapidly becomes black at a reaction time of 10 min or more. The film thickness distribution of the catalyst raw materials of this point (I) is Mo 0.05 nm/Co 0.3 nm. This is considered because in the vicinities of the points (I) to (III) having high activities the catalyst itself has particle sizes on which CNT is easily synthesized.

FIG. 5 is a graph showing results of microscopic Raman scattering spectroscopy measurements of the points (I) to (III). The abscissa of the graph in FIG. 5 designates the wavelength shift of Raman scattering. The ordinate of the graph designates the normalized intensity. As is clear from the graph, for each point (I) to (III), the peak of D band is small; and a peak of RBM emerges. The measurement results indicate production of high-quality SWNT. Further, in the condition of the point (II), G band is split into two peaks, which means that SWNT is especially of high quality.

FIG. 6 is scanning electron microscopic images of cross-sections of quartz glass substrates on which Mo and Co having film thicknesses corresponding to the points (I) to (III) are uniformly loaded and SWNT is grown. It is revealed that in the condition of the point (II), SWNT forms a thin film; in the condition of the point (III), SWNT is vertically oriented; and in the condition of the point (I), SWNT grows to a film thickness of 10 μm or more. FIG. 7 is a photograph showing a result of observation by a transmission electron microscope of SWNT transferred from on the quartz glass substrate to a grid. As is clear from this photograph, SWNT of about 1 to 5 nm in diameter is observed. Further, it is found that partially, multilayer CNT of 5 nm or more is observed, but there is little mingling of amorphous carbon and catalyst particles.

EXAMPLE 2

Example 2 of the present invention will be described. Here, as a support, a quartz glass ($SiO_2$) substrate was used. A film of 20 nm of $Al_2O_3$ as a catalyst carrier was formed thereon by sputtering. Further, a film of Fe as a catalyst raw material was formed thereon by sputtering. Fe was made to have a film thickness distribution of 0.2 to 20 nm to examine the CNT production activity depending on the catalyst amount. The quartz glass substrate was put in a CVD reactor; and the temperature in the CVD reactor was raised to 750° C. while a $H_2/Ar$ gas was circulated. Then, Fe was reduced; and Fe nanoparticle catalysts having a diameter and number density corresponding to the Fe film thicknesses were self-organizedly fabricated. The gas was changed over to pure ethylene and CVD was carried out at 600 Torr for 30 min to grow CNT.

The gas was changed over to ethylene and the synthesis by the CVD method was carried out for 30 min to grow CNT. FIG. 8 is a photograph of CNT obtained by the method of Example 2. As is clear from the photograph, the film thickness of the obtained CNT film largely varies depending on the Fe film thickness of the catalyst. When the Fe film thickness is 2 to 3 nm, the growth of CNT is most rapid and the growth of about 1.5 nm for 30 min is achieved. The film thickness of about 10 to 20 nm forms a continuous film, and does not make a catalyst for nanotubes, resulting in no synthesis of CNT.

The Fe film thickness distribution in FIG. 8 was fabricated as follows. A mask having slits at intervals was installed on a quartz glass substrate. When a film of Fe was formed from above the mask by sputtering, the film forming rate of Fe decreases corresponding to distances from the slits. A film of Fe was formed for 100 min and the film thickness distribution was measured by a stylus step profiler to determine the film forming rate distribution in Table 1. A film of Fe was formed for 15 min on a quartz glass substrate used in the CVD reaction, and the film thickness distribution is as in the third column of Table 1. FIG. 9 is a plot diagram whose abscissa is taken from the first column of Table 1 and whose ordinate is taken from the third column thereof. It is found that a distribution wherein the Fe film thickness exponentially decreases with respect to the distance from the end of the quartz glass substrate is formed.

TABLE 1

| Position [mm] | Film Forming Rate [nm/s] | Film Thickness [nm] at 15-min film forming |
|---|---|---|
| 1 | 0.0222 | 19.5 |
| 3 | 0.0077 | 7.0 |
| 4 | 0.0049 | 4.4 |
| 5 | 0.0034 | 3.1 |
| 6 | 0.0026 | 2.3 |
| 8 | 0.0016 | 1.4 |
| 10 | 0.0010 | 0.9 |

EXAMPLE 3

Example 3 of the present invention will be described. Here, as a support, a quartz glass ($SiO_2$) substrate was used. A film of 20 nm of $Al_2O_3$ as a catalyst carrier was formed thereon by sputtering. A film of Mo and Fe as catalyst raw materials was further fanned thereon by sputtering. Mo and Fe were made to have film thickness distributions orthogonal to each other of 0.1 to 10 nm and 0.08 to 5 nm, respectively, to examine the CNT production activity depending on the catalyst amounts. The quartz glass substrate was put in a CVD reactor; and the temperature of the CVD reactor was raised to 730° C. while a $H_2$/Ar gas was circulated. Then, the gas was changed over and while ethylene at 600 Torr, hydrogen at 6 Torr and argon at 50 Torr were supplied to the CVD reactor, the synthesis was carried out for 10 min by the CVD method to grow CNT.

FIG. 10 is a photograph of the quartz glass substrate on which CNT grown by the method of Example 3 was synthesized. The film thickness of Mo becomes thicker from the left toward the right (on display of the photograph) of the quartz glass substrate; and the film thickness of Fe becomes thicker from bottom toward top of quartz glass substrate. It is found that under certain conditions of Mo and Fe film thicknesses, CNT grows and the quartz glass substrate becomes black. A result obtained by installing the quartz glass substrate in a quartz glass tube and blowing on the surface with an air duster (shown' in FIG. 11) is shown on the photograph of FIG. 12. It is found that CNT on particular portions on the quartz glass substrate is scattered and the quartz glass substrate and the CNT are separated. A transmission electron microscopic image of the CNT thus separated is FIG. 13. It is found that CNT containing SWNT of about 5 to 10 nm in diameter is obtained.

EXAMPLE 4

Example 4 of the present invention will be described. FIG. 14 shows results obtained by simultaneously using plural kinds of catalysts and experimentally examining the CNT synthesis by CVD, separation of CNT from a substrate, regeneration of the catalysts and resynthesis of CNT by CVD. With respect to the Fe—Mo catalyst, the CVD at the first time and the separation of CNT from a substrate are the same as in FIG. 10 (Example 3). Here, as a support, a quartz glass ($SiO_2$) substrate was used. A film of 20 nm of $Al_2O_3$ was formed thereon by sputtering. Further, films of Mo and Fe, Mo and Ni, and Mo and Co as catalyst raw materials were each formed thereon by sputtering.

Mo, and Fe, Ni and Co form film thickness distributions orthogonal to each other; the film thickness of Mo was 0.1 to 10 nm; that of Fe was 0.08 to 5 nm; that of Ni was 0.1 to 10 nm; and that of Co was 0.1 to 10 nm. The quartz glass substrates were each put in a CVD reactor; and the temperature in the CVD reactor was raised to 730° C. while a $H_2$/Ar gas was circulated. Then, the gas was changed over and while ethylene at 600 Torr, hydrogen at 6 Torr and argon at 50 Torr were supplied to the CVD reactor, CVD was carried out for 10 min to grow CNT. The leftmost column described as first time of FIG. 14 indicates images obtained by scanning the quartz glass substrates after the CNT growth by an optical scanner.

It is found that the production of CNT by Fe—Mo catalyst is excellent. In the successive second column, a result after the surface of the quartz glass substrate was blown on with a duster and CNT was separated from the quartz glass substrate is shown. Only in the case of Fe—Mo catalyst, and in a certain catalyst condition, CNT is separated. Even if the quartz glass substrate is subjected to an ultrasound treatment in ethanol, CNT is not much separated (the third column). If the quartz glass substrate is annealed at 730° C. for 10 min, it turns to be transparent and colorless (the fourth column). Hence, it is found that the carbon content such as CNT or amorphous carbon has been oxidatively removed.

Results obtained by putting the quartz glass substrates in a CVD reactor and loading out CVD similarly to the first time CVD are shown in the fifth column. Paying attention to the Fe—Mo catalyst, even if CNT grows and changes its color into black at the first time CVD, there is some region where CNT does not grow at the second time CVD. This is considered because when CNT is separated from a substrate by a duster, the catalyst has been separated together with CNT from the quartz glass substrate. On the other hand, on a portion indicated as "suitable condition" on the right side, the CNT separation by a duster has been accomplished, and additionally, CNT is found to have grown also at the second time CVD.

This indicates that containing some amount of Mo in the catalyst improves the adhesiveness of the catalyst with the quartz glass substrate, and therefore, the catalyst remains on the quartz glass substrate when CNT is separated from the quartz glass substrate. In the CVD synthesis of CNT, the inactivation of catalyst particles is an essential problem. In addition to the chemical change such as carbonization and oxidation, coarsening by aggregation of catalyst particles is also an important problem. This Example indicates that loading out the reduction after the oxidation of the catalyst after the separation of CNT can simultaneously solve the problem of carbonization and oxidation. Additionally, it implies that the catalyst is oxidized and the substrate is wetted with the catalyst in the oxidized state, and then, the catalyst is reduced, and thereby repels in the metal state to turn into microparticles, thus enabling redispersion of the catalyst particles.

The massive synthesis method of the present invention achieves the three-dimensional spreading of a substrate-loaded catalyst, and a merger of the gas-phase dispersion and the substrate loading. The honeycomb permits a gas flow well, and the gas excellently contacts also with the loaded catalyst. Use of a honeycomb of 10 cm square having a structure in which substrates are stacked at 1-mm intervals increases the area by 40 times. For example, the SWNT synthesis rate by Super Growth is $3 \times 10^{-3}$ m$^3$/m$^2$/10 min$\times$ 0.037 ton/m$^3 \times 4.32 \times 10^4$ min/month≈0.5 ton/m$^2$/month. If a honeycomb is applied to this, a very high synthesis rate per volume of 0.5 ton/m$^2$/month$\times 4 \times 10^3$ m$^2$/m$^3$=2,000 ton/m$^3$/month can be achieved. In the present invention, in the case where the separation of SWNT by a gas pulse and the reuse of a honeycomb with catalysts are employed, and the synthesis rate is about 0.5 mm/10 min, the monthly synthesis rate is 300 ton/m$^3$/month.

EXAMPLE 5

Example 5 of the present invention will be described. Here, as a support, a plate cut-out from a cordierite-made honeycomb was used. A film of 20 nm of Al$_2$O$_3$ as a catalyst carrier was formed thereon by sputtering. A film of Mo and Fe as catalyst raw materials was further formed thereon by sputtering. Mo and Fe were made to have film thickness distributions orthogonal to each other of 0.2 to 20 nm and 0.5 to 30 nm, respectively, to examine the CNT production activity depending on the catalyst amounts. The support was put in a CVD reactor; and the temperature of the CVD reactor was raised to 800° C. while a H$_2$/Ar gas was circulated. Then, the gas was changed over to pure ethylene and the CVD was carried out at 30 Torr for 10 min to grow CNT.

FIG. 15 shows a photograph of the support on which CNT has grown. The film thickness of Mo becomes thicker from the left toward the right of the support; and the film thickness of Fe becomes thicker from bottom toward top of the support. It is found that under certain conditions of Mo and Fe film thicknesses, CNT grows and the support becomes black. FIG. 16 is a measurement result of microscopic Raman spectroscopy of the arrowed portion of the support (see FIG. 15). The peak of G band is split into two; the peak of D band is small; and the peak of RBM emerges. Thereby, a high-quality SWNT is found to be produced. It is found that, thus, one layer of a suitable catalyst carrier is laid, and a catalyst is then loaded, thereby enabling synthesis of SWNT even on a honeycomb support.

EXAMPLE 6

Example 6 of the present invention will be described. Here, as a support, a quartz glass (SiO$_2$) substrate was used. A film of 10 to 30 nm of Al$_2$O$_3$ as a catalyst carrier was formed thereon by sputtering. A film of 0.2 to 3 nm of Fe as a catalyst raw material was further formed thereon by sputtering. The support was put in a CVD reactor; and the temperature of the CVD reactor was raised to 750 to 820° C. while a H$_2$O/Ar gas was circulated. The support was held in H$_2$ gas at 200 Torr, H$_2$O steam at 0 to 0.15 Torr, Ar gas at 560 Torr, and at the above-mentioned temperature for 10 min.

Under this condition, Fe formed nanoparticles. Then, the gas was changed over to C$_2$H$_4$, H$_2$, H$_2$O and Ar, and CVD was carried out for 10 min to grow SWNT. At this time, C$_2$H$_4$ was at 30 to 120 Torr; H$_2$ was at 100 to 300 Torr; H$_2$O was at 0 to 0.15 Torr. As the remainder, Ar was supplied such that the total was at 760 Torr. As a result of the synthesis for 10 min, SWNT grew to several millimeters. FIG. 19 is a photograph of the Al$_2$O$_3$ carrier after Fe was loaded by 0.2 to 3 nm on the carrier, and CVD was carried out for 10 min to grow SWNT.

As is clear from FIG. 19, the catalyst amount varies in the horizontal direction, and SWNTs having different thicknesses grow in different degrees. FIG. 20 is a transmission electron microscopic (TEM) photograph of nanotubes grown in the same condition of the Fe catalyst of 0.5 nm. From the Figure, it is found that many of nanotubes are SWNTs of 4 to 5 nm in diameter. FIG. 21 is a transmission electron microscopic (TEM) photograph of nanotubes grown in the same condition of the Fe catalyst of 1.0 nm. From the Figure, it is found that many of nanotubes are SWNTs of 7 to 8 nm in diameter.

Industrial Applicability

The method for production of a carbon nanotube of the present invention allows for a mass production and a much reduction of production costs. Therefore, as applications of the carbon nanotube produced by the present invention, attention is paid to applications to hydrogen storage, electrode materials of lithium ion batteries, electrode materials of hydrogen fuel cells, electron-emitting guns, low-power displays, probes and the like. Particularly, as applications of the single carbon nanotube produced by the present invention, attention is paid to applications to hydrogen storage, electrode materials of lithium ion batteries, electrode materials of hydrogen fuel cells, and the like.

Brief Description Of The Drawings

FIG. 14 is a diagram showing results obtained by simultaneously using plural kinds of catalysts and experimentally examining the CNT synthesis by CVD, separation of CNT from a substrate, regeneration of the catalysts and resynthesis of CNT;

Figure 1:
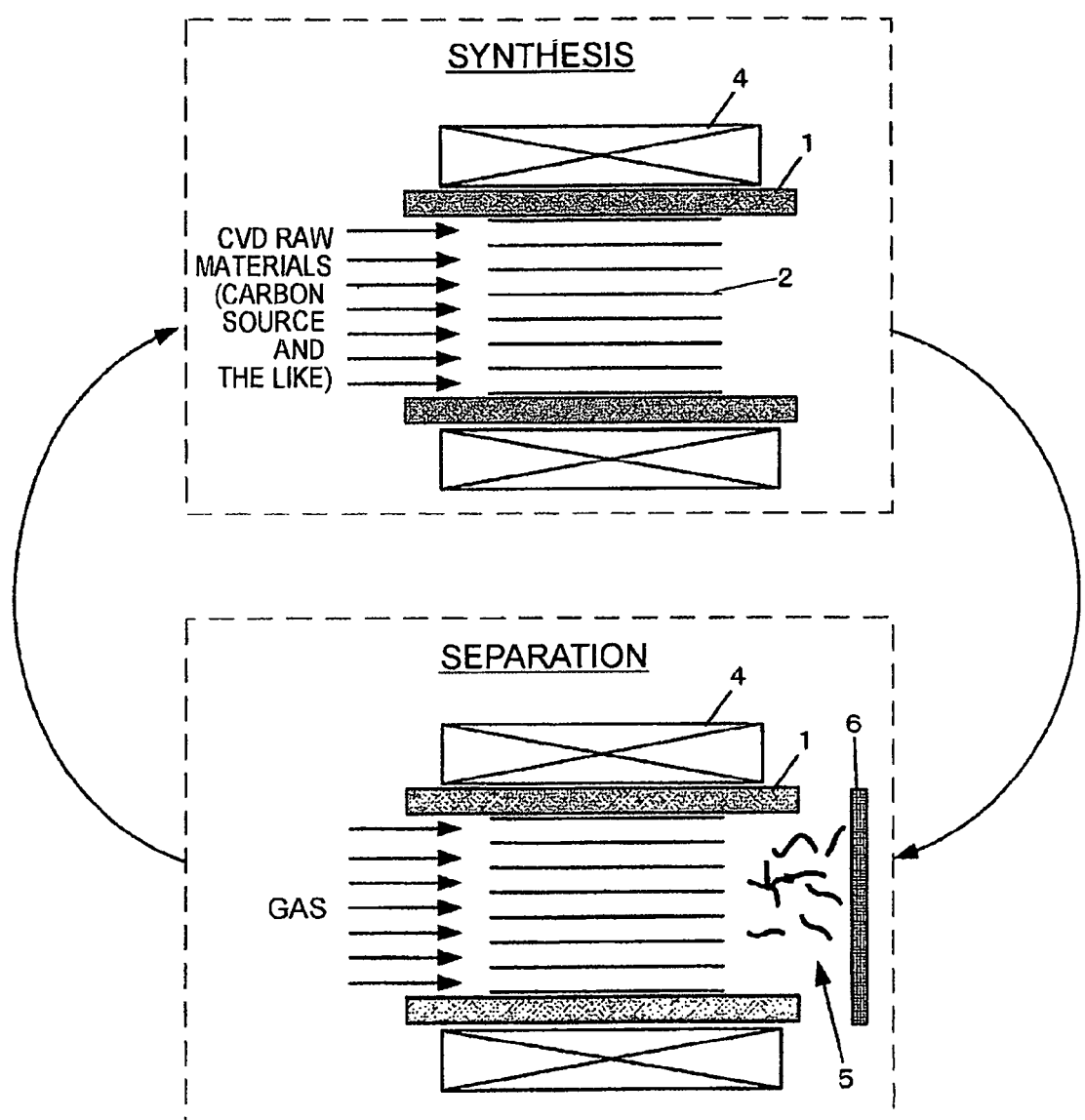
FIG. 1 is a diagram showing the outline of an embodiment of the present invention.
Figure 2:
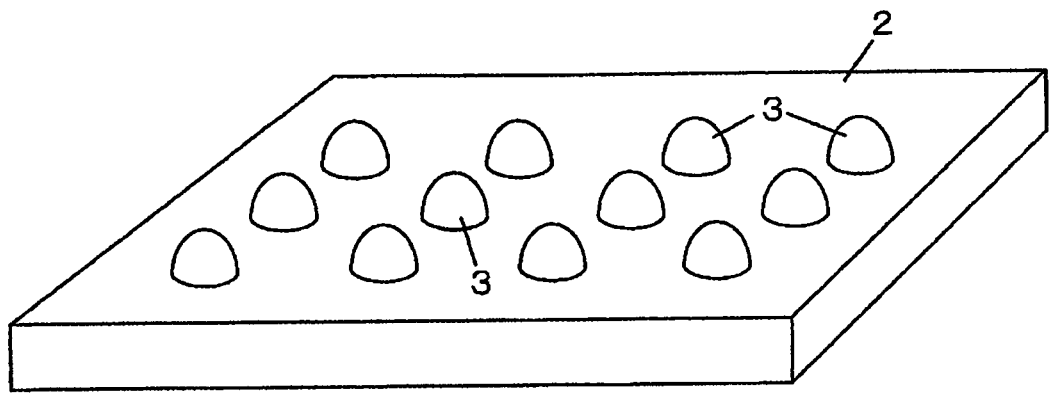
FIG. 2 is a diagram showing a nanoparticle catalyst formed on a fixed substrate according to an embodiment of the present invention.
Figure 3:
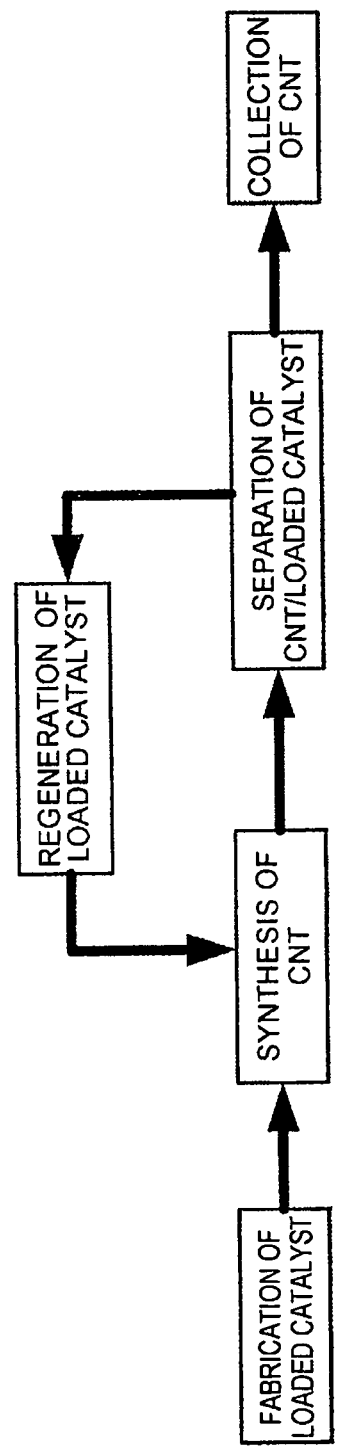
FIG. 3 is a diagram showing a process flow when CNT is synthesized.
Figure 4:
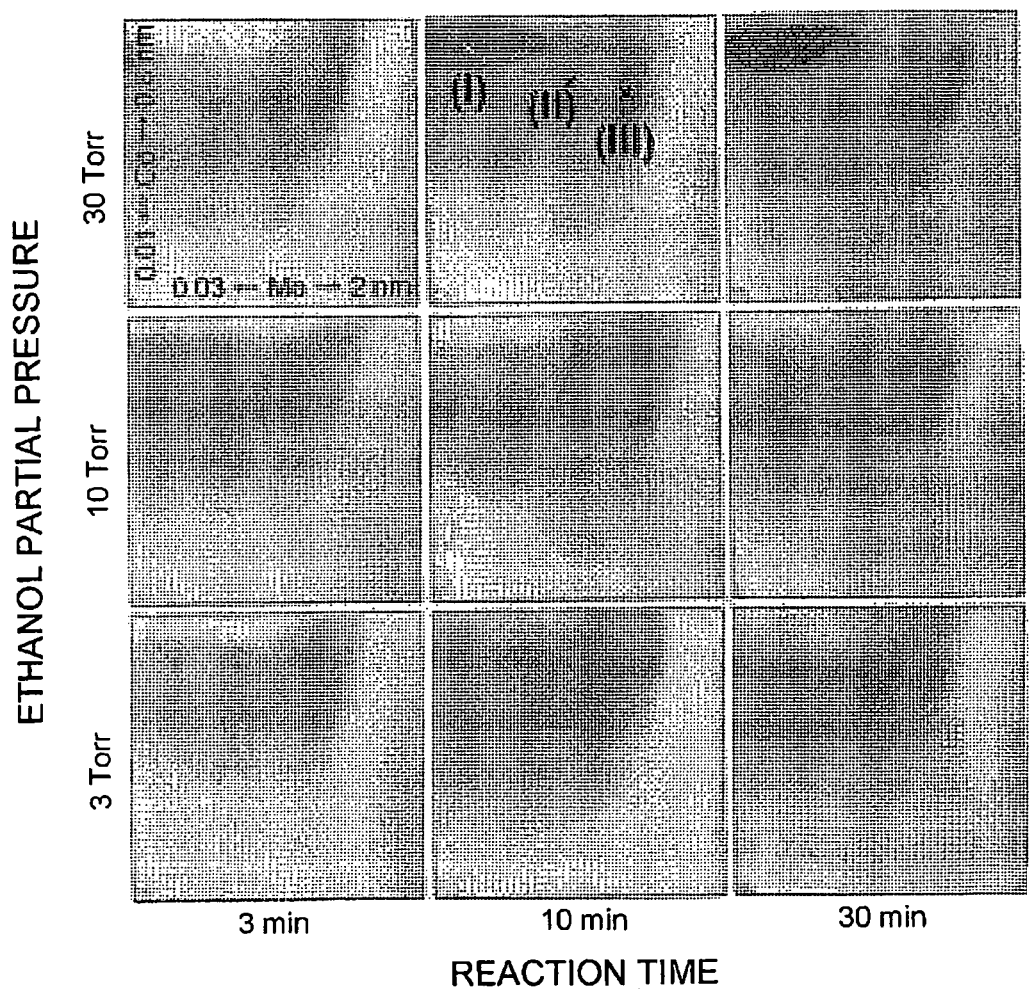
FIG. 4 is optically scanned images of quartz glass substrates obtained in Example 1 according to the present invention.
Figure 5:
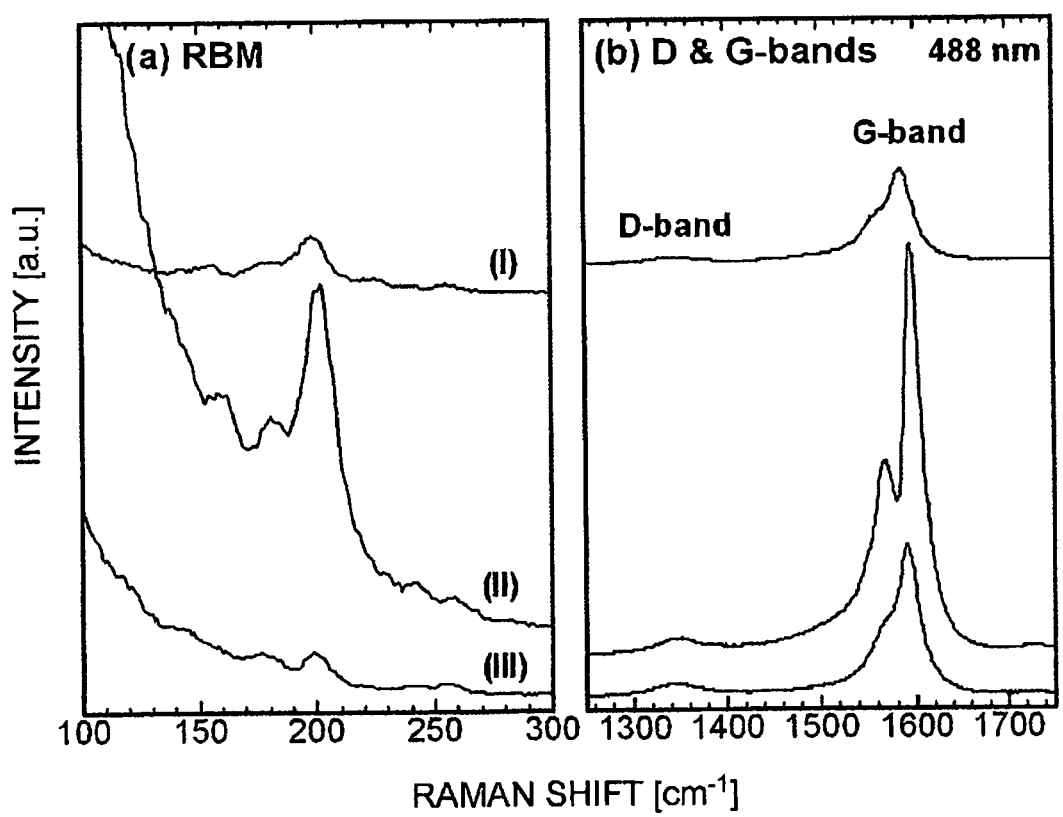
FIG. 5 is a graph showing a measurement result of microscopic Raman scattering spectroscopy of points (I) to (III) in FIG. 4.
Figure 6:
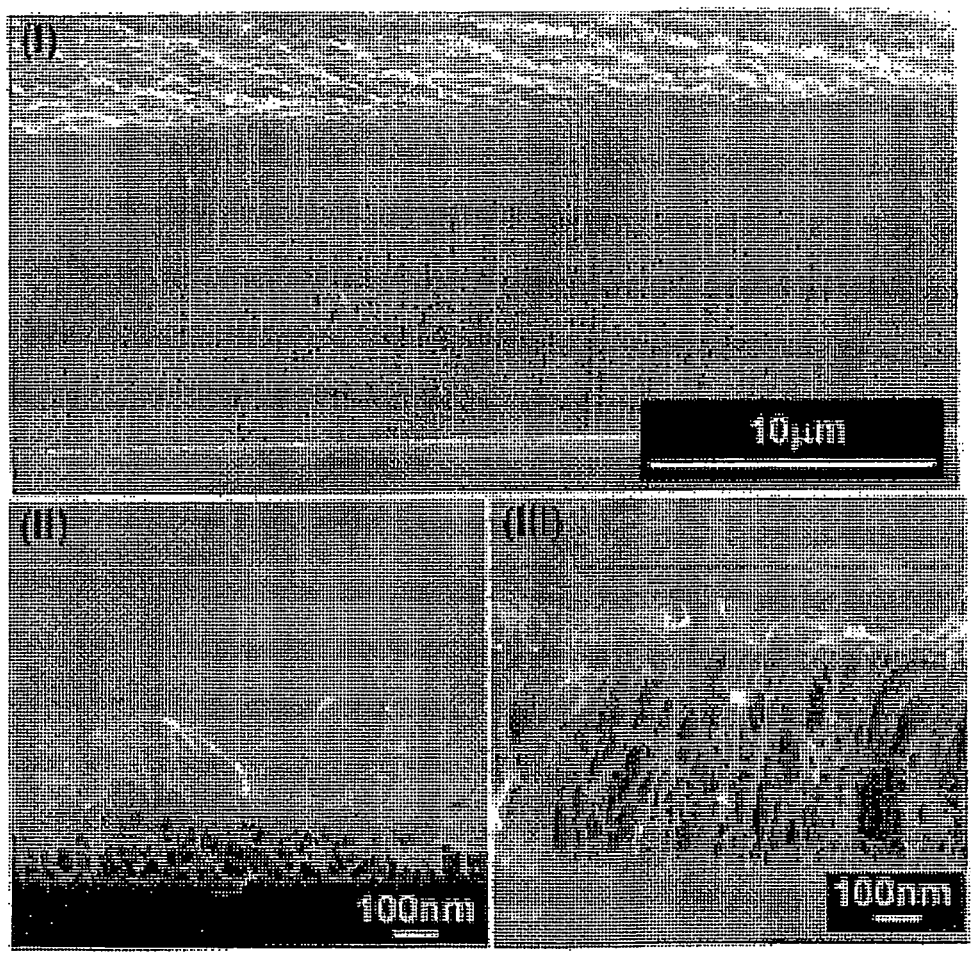
FIG. 6 is transmission electron microscopic images of cross-sections of quartz glass substrates on which Mo and Co having a film thicknesses corresponding to the points (I) to (III) in FIG. 4 were loaded and SWNT was made to grow.
Figure 7:
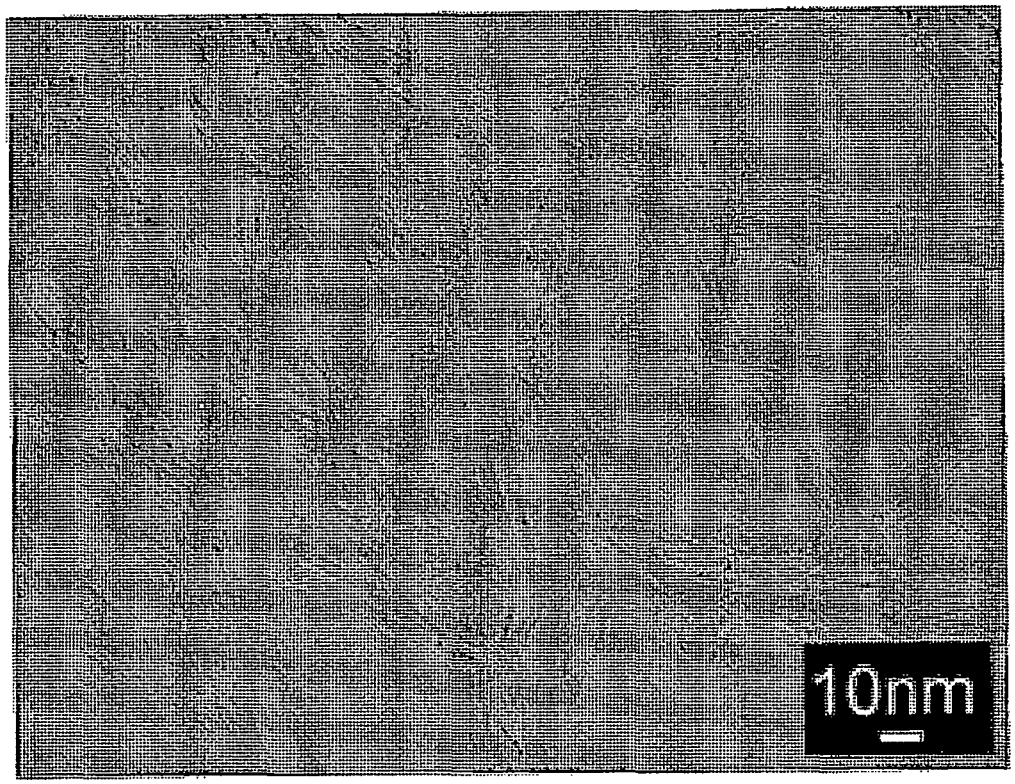
FIG. 7 is a photograph showing a result obtained by observation by a transmission electron microscope of SWNT on the quartz glass substrate in FIG. 6.
Figure 8:
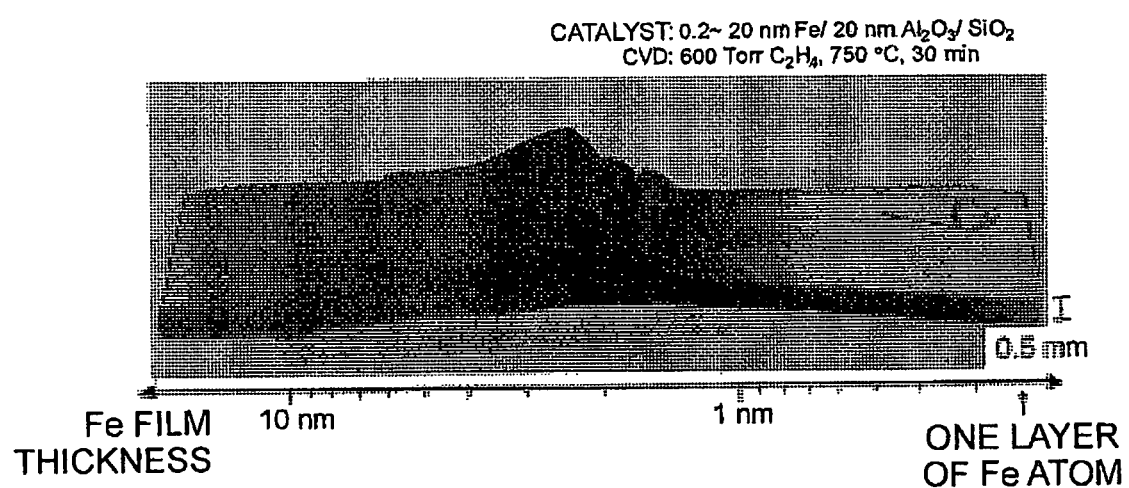
FIG. 8 is a photograph of CNT obtained by the method in Example 2 according to the present invention.
Figure 9:
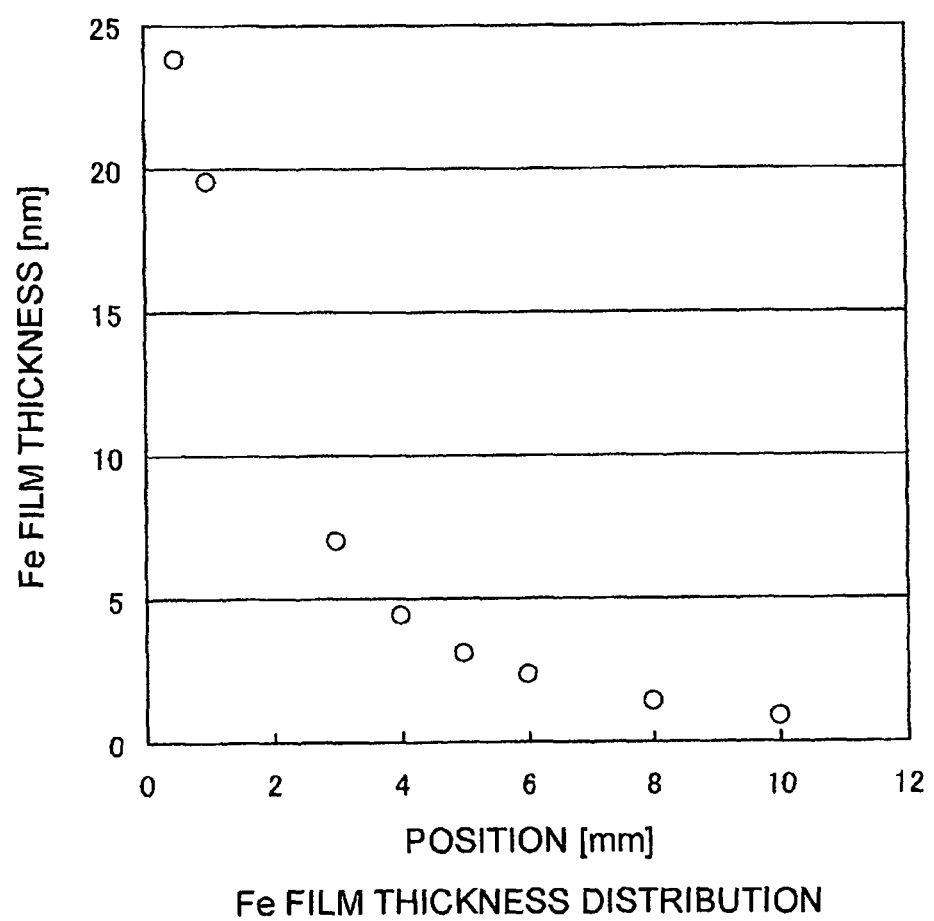
FIG. 9 is a graph showing a film thickness distribution on the quartz glass substrate obtained by the method in Example 2 according to the present invention.
Figure 10:
FIG. 10 is a photograph of a quartz glass substrate on which CNT grew by the method in Example 3 according to the present invention was formed.
Figure 10:
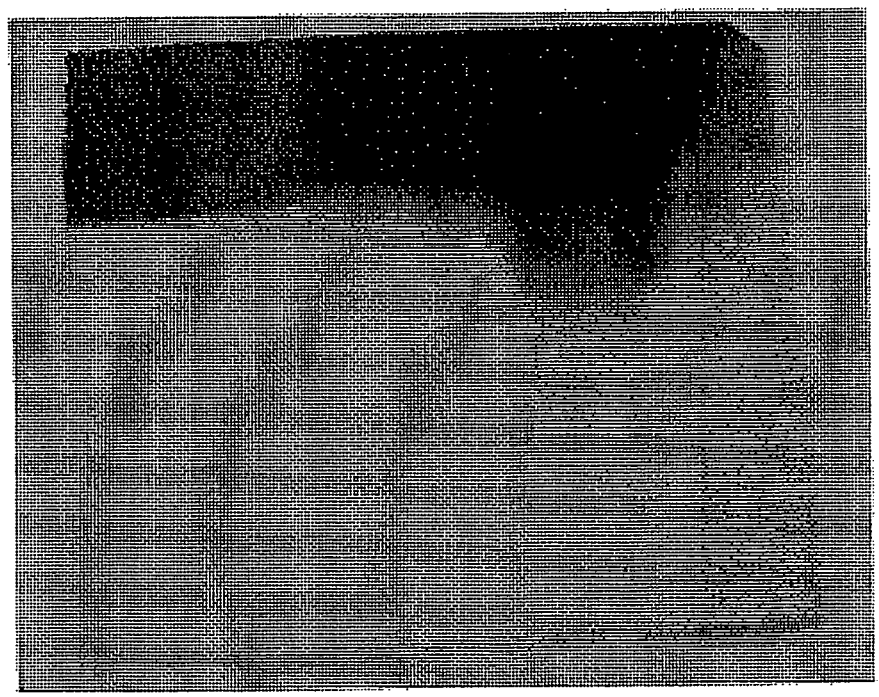
Figure 11:
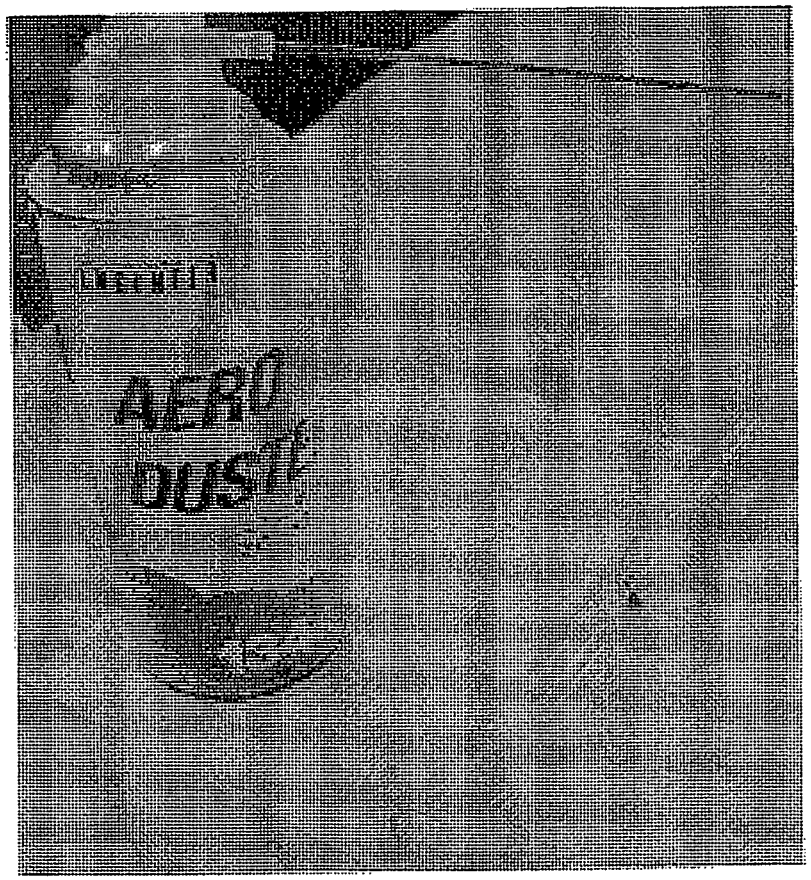
FIG. 11 is a photograph showing an air duster used in Example 3 according to the present invention.
Figure 12:
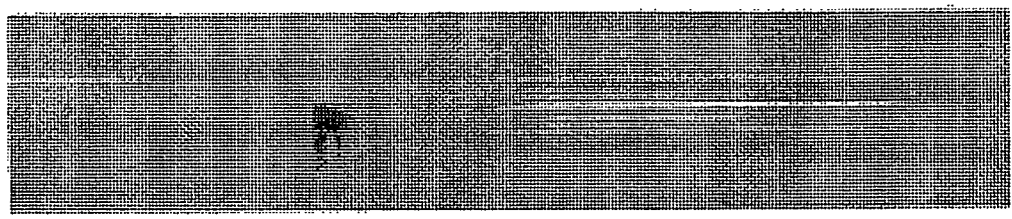
FIG. 12 is a photograph showing a result obtained by installing a quartz glass substrate used in Example 3 according to the present invention in a quartz glass tube and blowing on the surface with the air duster (shown in FIG. 8)
Figure 13:
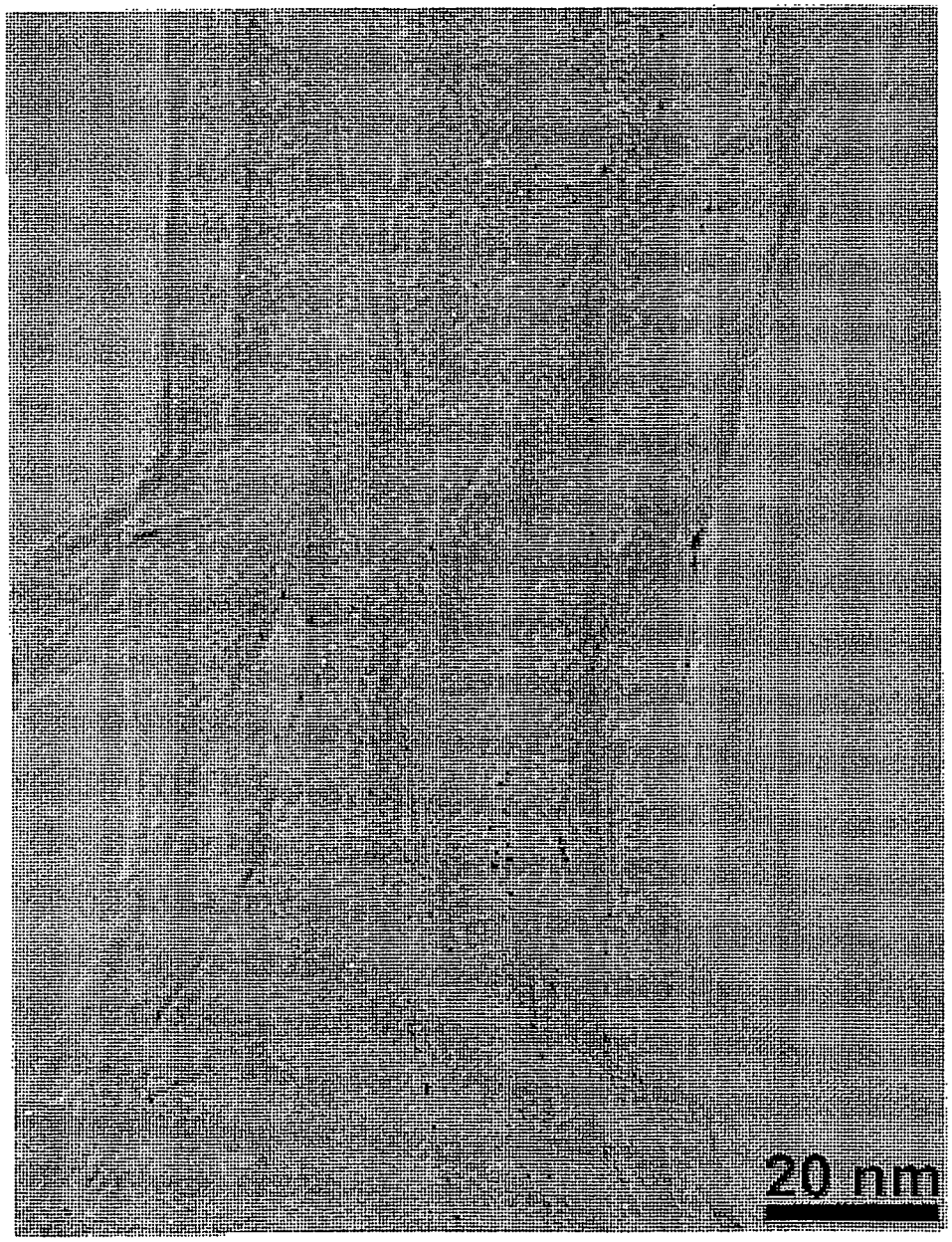
FIG. 13 is a photograph showing a transmission electron microscopic image of CNT separated in Example 3 according to the present invention.
Figure 15:
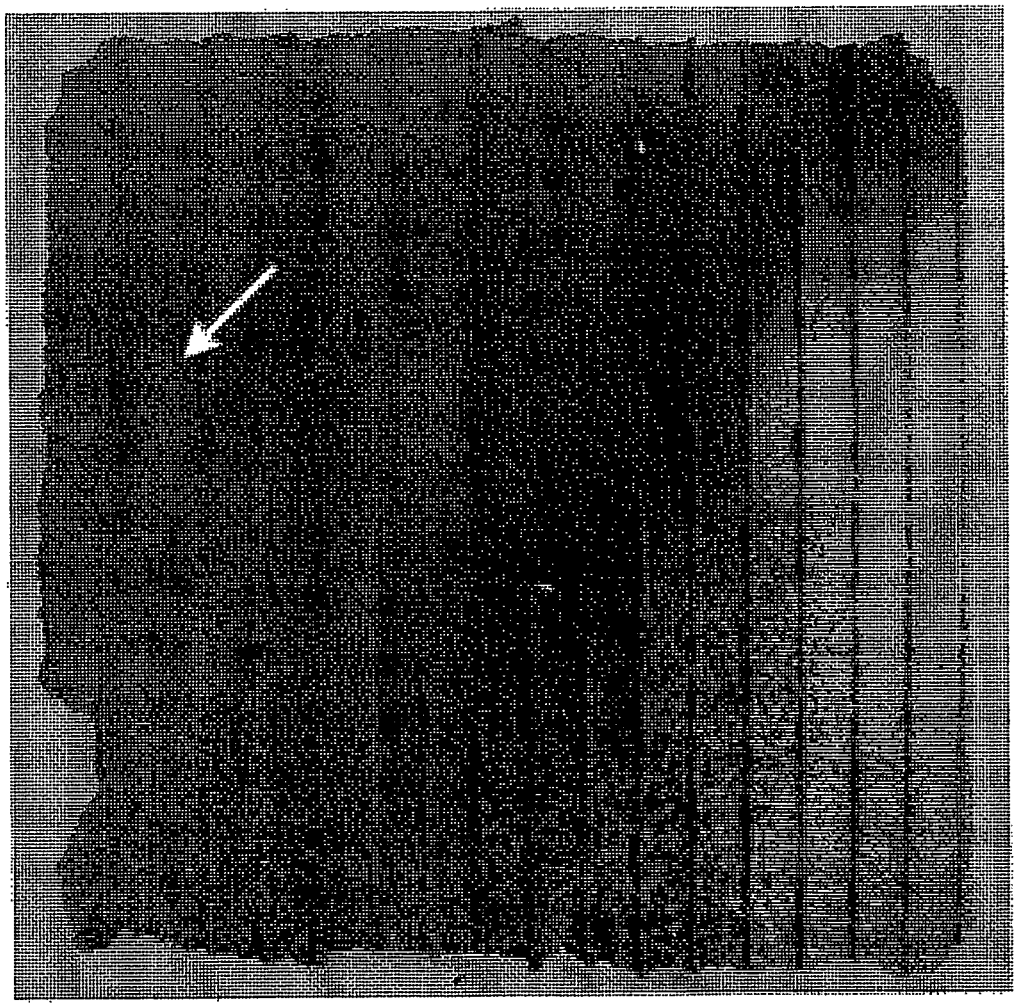
FIG. 15 is a photograph of a support on which CNT has grown in Example 5 according to the present invention.
Figure 16:
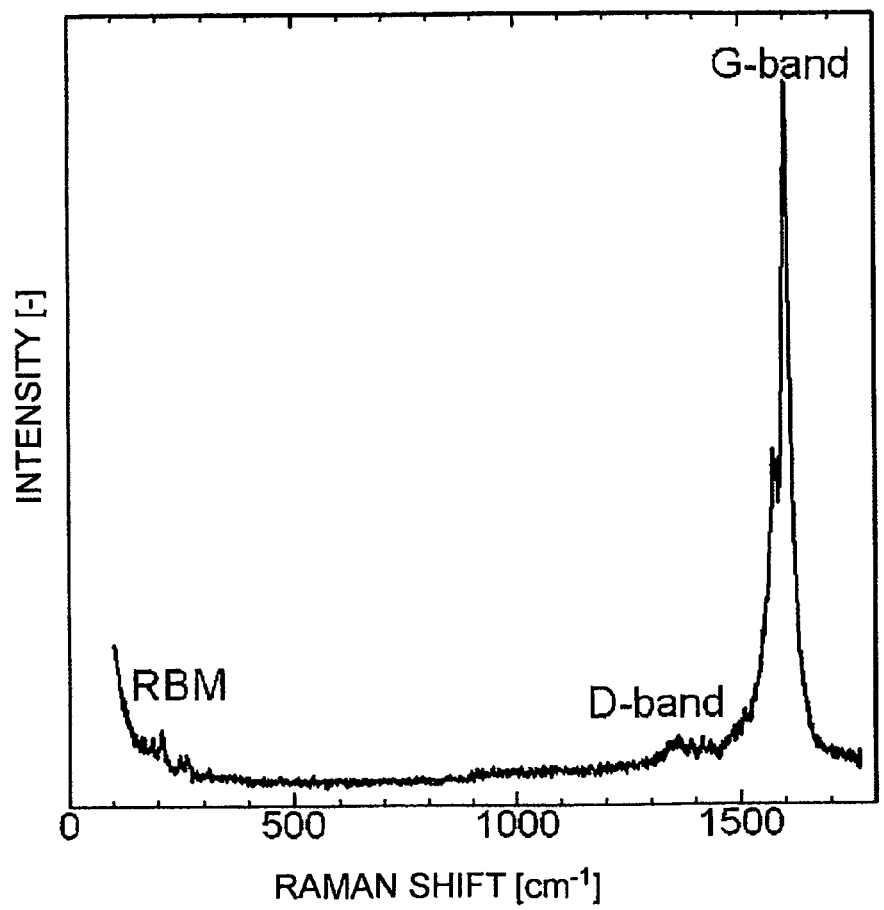
FIG. 16 is a diagram showing a measurement result by microscopic Raman spectroscopy of the arrowed portion in the photograph in FIG. 13.
Figure 17:
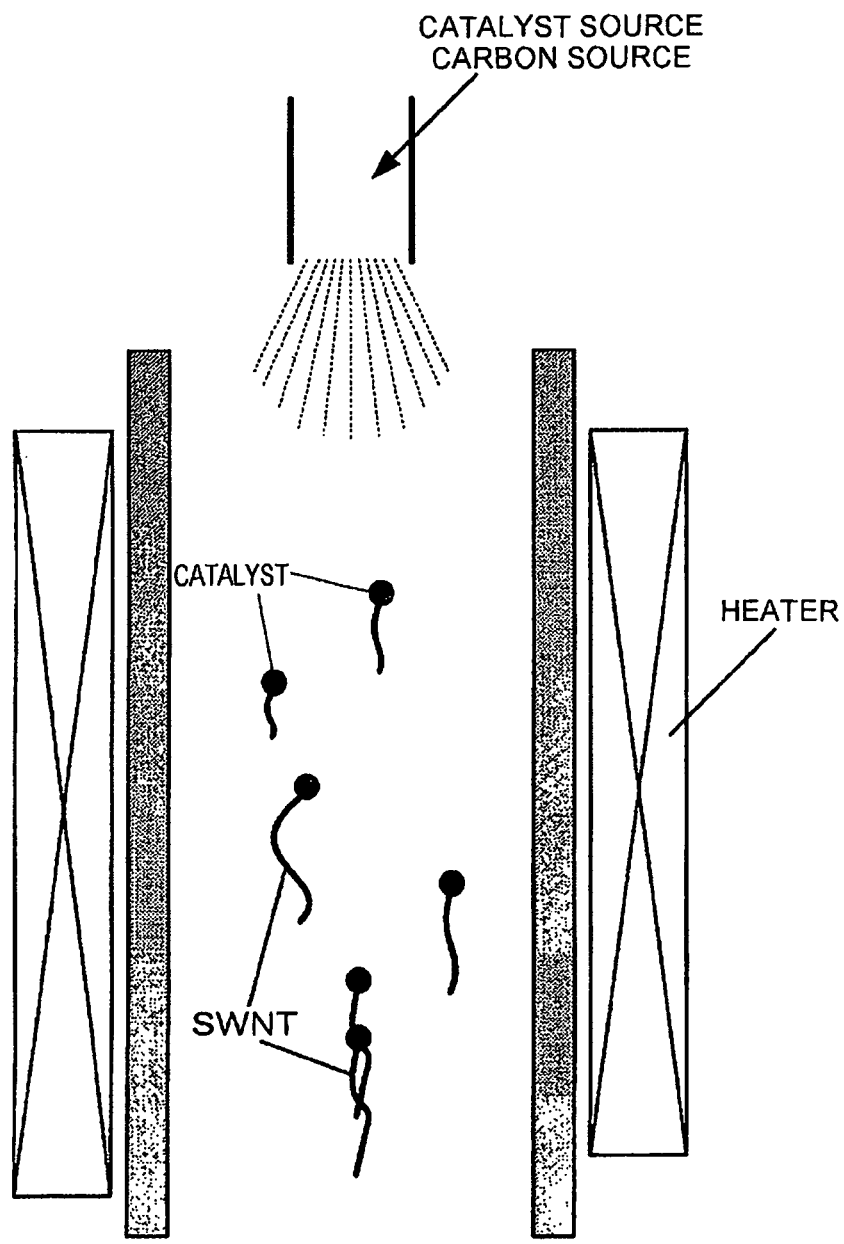
FIG. 17 is a diagram (a conventional technology) showing the outline of production of CNT using a nanoparticle catalyst in the gas phase-dispersed state (method A)
Figure 18:
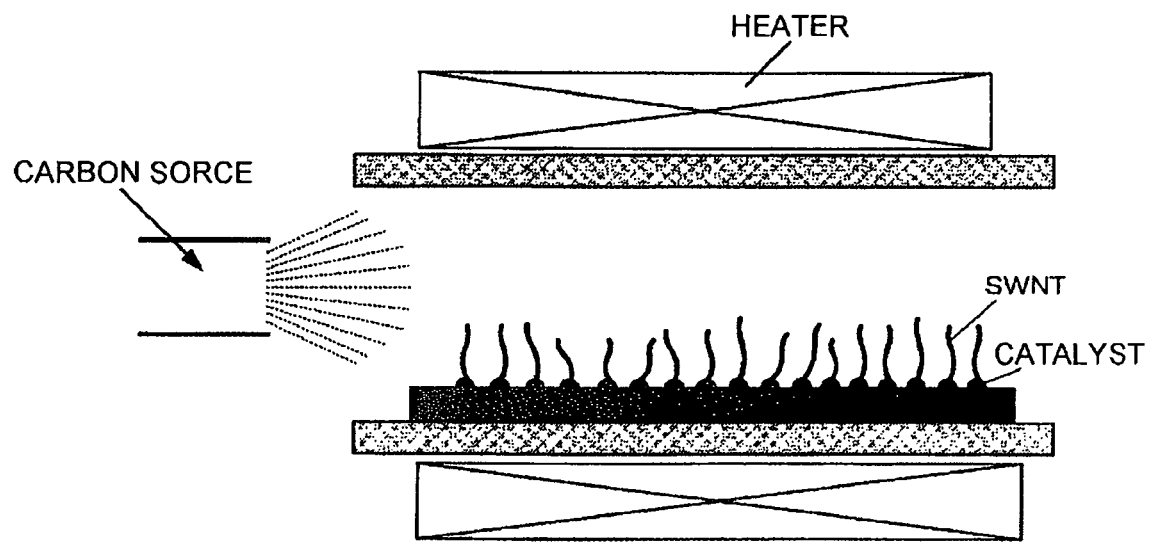
FIG. 18 is a diagram (a conventional technology) showing the outline of production of CNT using a nanoparticle catalyst in the substrate-loaded state (method B)
Figure 19:
FIG. 19 is a photograph of a support on which SWNT has grown in the embodiment 6.
Figure 20:
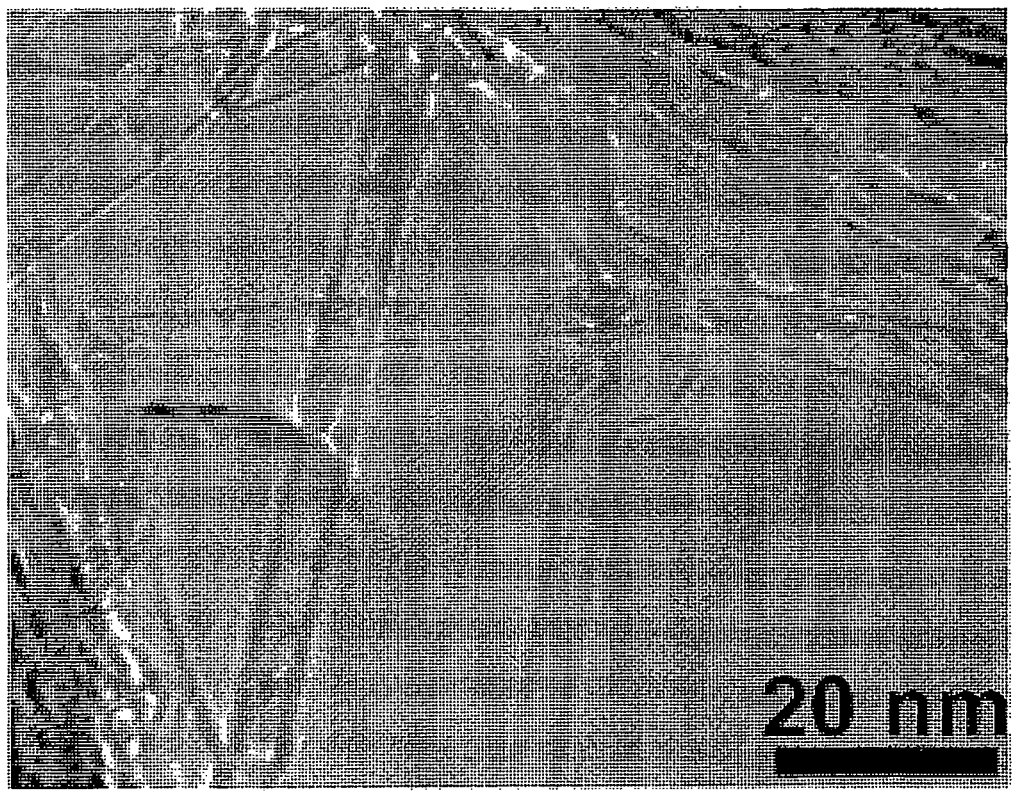
FIG. 20 is a transmission electron microscopic (TEM) photograph of nanotubes in the case of the 0.5-nm Fe catalyst in the embodiment 6.
Figure 21:
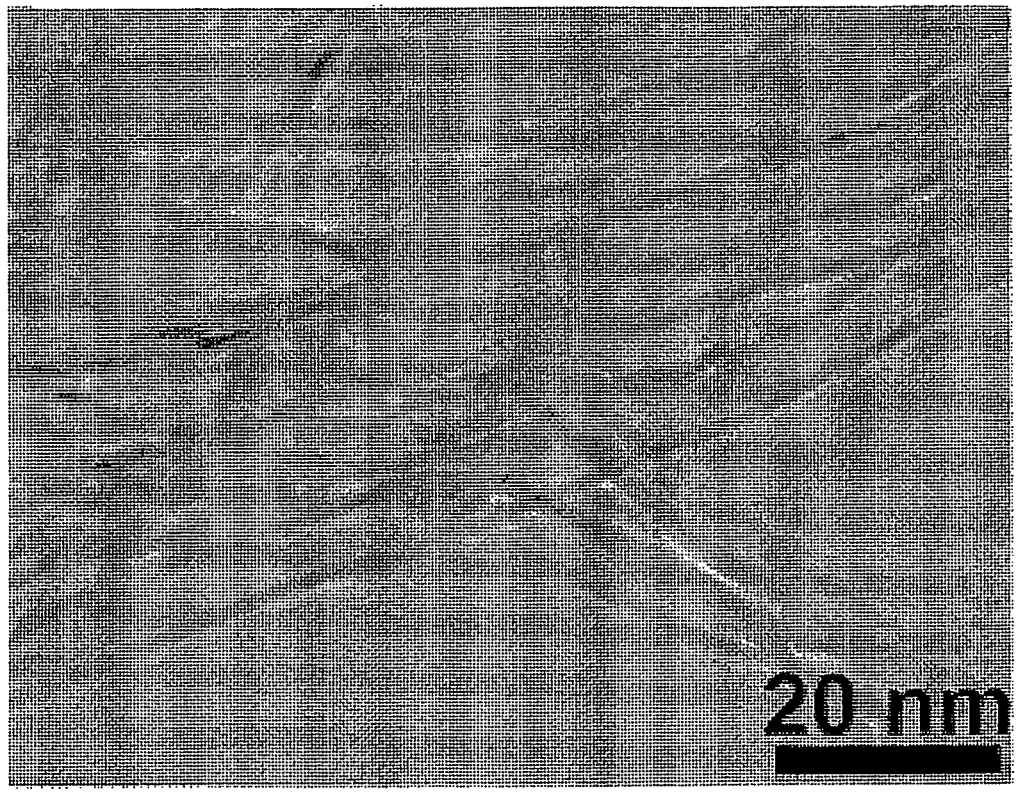
FIG. 21 is a transmission electron microscopic (TEM) photograph of nanotubes in the case of the 1.0-nm Fe catalyst in the embodiment 6.

| | Description of Symbols |
|---|---|
| 1 | CYLINDER |
| 2 | HONEYCOMB |
| 3 | CATALYST |
| 4 | HEATER |
| 5 | CNT |
| 6 | FILTER |

The invention claimed is:

1. A method for production of a carbon nanotube, characterized by a carbon nanotube synthesis method in which a carbon source is supplied on a catalyst loaded on a support to synthesize the carbon nanotube, the synthesis method comprising:
   heating the support to raise the temperature of the catalyst;
   supplying a raw material gas containing the carbon source to synthesize the carbon nanotube;
   recovering the synthesized carbon nanotube; and after the recovery,
   subjecting the catalyst to a regeneration treatment to repeatedly utilize the support for the synthesis,
   wherein the support is a solid material having a honeycomb structure having a large specific surface area, and wherein said honeycomb structure comprises stacking members with an interval between adjacent members and with the stacking members being crossed.

2. The method for production of a carbon nanotube according to claim 1, characterized in that the honeycomb structure has a specific surface area of 0.1 mm$^2$/mm$^3$ or more.

3. The method for production of a carbon nanotube according to claim 1, characterized in that the support comprises a ceramic comprising one or more elements selected from Si, Al, Zr and Mg.

4. The method for production of a carbon nanotube according to claim 1, characterized in that the support comprises a metal or an alloy comprising one or more elements selected from Fe, Co and Ni.

5. The method for production of a carbon nanotube according to claim 1, characterized in that the catalyst is loaded by bringing a liquid raw material obtained by dissolving a raw material for the catalyst in a solvent into contact on the support, and drying the liquid raw material.

6. The method for production of a carbon nanotube according to claim 1, characterized in that the catalyst is loaded by bringing a gas raw material obtained by vaporizing a raw material for the catalyst into contact on the support.

7. The method for production of a carbon nanotube according to claim 1, characterized in that the catalyst comprises one or more elements selected from Fe, Co, Ni, Mo and Cr as a component(s) thereof.

8. The method for production of a carbon nanotube according to claim 1, characterized in that the catalyst is formed on a catalyst carrier comprising one or more elements selected from Si, Al, Mg, Zr and Mo.

9. The method for production of a carbon nanotube according to claim 1, characterized in that the catalyst is partially covered with a catalyst capping material comprising one or more elements selected from Si, Al, Mg, Zr and Mo.

10. The method for production of a carbon nanotube according to claim 1, characterized in that the carbon nanotube is synthesized by a thermochemical vapor deposition method in which a thermal energy is imparted to the raw material gas by heating means to activate the carbon source, and the carbon source is adsorbed and deposited on the catalyst.

11. The method for production of a carbon nanotube according to claim 10, characterized in that the carbon nanotube is synthesized by heating an entire reactor by a heating furnace.

12. The method for production of a carbon nanotube according to claim 10, characterized in that the carbon nanotube is synthesized by ohmically heating the support.

13. The method for production of a carbon nanotube according to claim 1, characterized in that the raw material of the carbon source comprises one or more selected from alkanes, alkenes, alcohols, ethers, aldehydes, ketones, aromatics, acetylene and carbon monoxide.

14. The method for production of a carbon nanotube according to claim 10, comprising loading out the thermochemical vapor deposition method by circulating a gas comprising the raw material of the carbon source at 0.001 MPa (0.01 atm) to 1.013 MPa (10 atm).

15. The method for production of a carbon nanotube according to claim 14, characterized in that the gas comprises oxygen as an element.

16. The method for production of a carbon nanotube according to claim 1, characterized in that the synthesized carbon nanotube is separated from the support by a gas pulse of which the flow rate varies on a certain time period.

17. The method for production of a carbon nanotube according to claim 1, characterized in that the synthesized carbon nanotube is separated from the support by a stationary gas flow having a constant flow rate.

18. The method for production of a carbon nanotube according to claim 16, characterized in that the gas containing the separated carbon nanotube is filtered by a filter and the carbon nanotube is collected on the filter.

19. The method for production of a carbon nanotube according to claim 16, characterized in that the gas containing the separated carbon nanotube is brought into contact with a liquid to collect the carbon nanotube in the liquid.

20. The method for production of a carbon nanotube according to claim 16, characterized in that the gas containing the separated carbon nanotube is brought into contact with a solid wall or a liquid wall by a gas flow to collect the carbon nanotube.

21. The method for production of a carbon nanotube according to claim 20, characterized in that the solid wall or the liquid wall has a temperature lower than that of the gas flow, and
   the carbon nanotube is collected by thermal migration.

22. The method for production of a carbon nanotube according to claim 1, characterized in that the regeneration treatment of the catalyst involves an oxidation treatment of the catalyst.

23. The method for production of a carbon nanotube according to claim 22, characterized in that the catalyst is reduced by feeding, contacting and circulating a reducing gas on a surface of the catalyst after the oxidation treatment.

24. The method for production of a carbon nanotube according to claim 22, characterized in that the catalyst is reduced by vaporizing the carbon source, and feeding, contacting and circulating the vaporized carbon source on a surface of the catalyst after the oxidation treatment, to carry out the regeneration treatment of the catalyst.

25. The method for production of a carbon nanotube according to claim 1, characterized in that the regeneration treatment of the catalyst involves replenishment of an element contained in the catalyst.

26. The method for production of a carbon nanotube according to claim 25, characterized in that a gas comprising the element contained in the catalyst is fed to a surface of the catalyst to carry out the replenishment.

27. The method for production of a carbon nanotube according to claim 25, characterized in that the element is contained in the catalyst and/or the support in advance, and the element is gradually diffused on a surface of the catalyst carrier to carry out the replenishment.

28. The method for production of a carbon nanotube according to claim 1, characterized in that the carbon nanotube is a single-walled carbon nanotube.

29. The method for production of a carbon nanotube according to claim 17, characterized in that the gas containing the separated carbon nanotube is filtered by a filter, and the carbon nanotube is collected on the filter.

30. The method for production of a carbon nanotube according to claim 17, characterized in that the gas containing the separated carbon nanotube is brought into contact with a liquid, to collect the carbon nanotube in the liquid.

31. The method for production of a carbon nanotube according to claim 17, characterized in that the gas containing the separated carbon nanotube is brought into contact with a solid wall or a liquid wall by a gas flow, to collect the carbon nanotube.

32. The method for production of a carbon nanotube according to claim 31, characterized in that the solid wall or the liquid wall has a temperature lower than that of the gas flow, and the carbon nanotube is collected by thermal migration.

33. The method for production of a carbon nanotube according to claim 2, wherein said specific surface area is 0.1 to 10.0 $mm^2/mm^3$.

34. The method for production of a carbon nanotube according to claim 1, wherein the honeycomb structure has a length extending in a first direction, and the raw material gas is supplied in said first direction, along surfaces of the support which is the solid material having the honeycomb structure.

* * * * *